United States Patent [19]
Heinrich

[11] Patent Number: 5,124,972
[45] Date of Patent: Jun. 23, 1992

[54] MECHANISM FOR PRECISE LINEAR MOVEMENT, AND APPARATUS USING SUCH A MECHANISM FOR SCANNING A DISC

[75] Inventor: Norbert Heinrich, Vienna, Austria

[73] Assignee: U.S. Philips Corporation, New York, N.Y.

[21] Appl. No.: 475,615

[22] Filed: Feb. 2, 1990

[30] Foreign Application Priority Data

Feb. 3, 1989 [AT] Austria .................. 223/89

[51] Int. Cl.$^5$ .................. G11B 21/02; G11B 21/06
[52] U.S. Cl. .................. 369/219; 369/215; 369/244
[58] Field of Search .............. 369/215, 219, 244, 258, 369/223; 360/99.04, 99.05, 99.06, 96.5; 409/12, 18; 74/640, 750

[56] References Cited

U.S. PATENT DOCUMENTS

| | | | |
|---|---|---|---|
| 3,773,335 | 11/1973 | Kato | 360/101 X |
| 4,347,926 | 9/1982 | Alter et al. | 198/388 |
| 4,479,745 | 10/1984 | Johnson et al. | 409/18 X |
| 4,878,138 | 10/1989 | Ando et al. | 360/99.02 |

FOREIGN PATENT DOCUMENTS

| | | | |
|---|---|---|---|
| 59-116964 | 7/1984 | Japan | 369/215 |
| 63-179474 | 7/1988 | Japan | 369/215 |

OTHER PUBLICATIONS

IBM Technical Disclosure Bulletin, vol. 22, No. 9, Feb. 1980, (p. 4152).

*Primary Examiner*—Stuart S. Levy
*Assistant Examiner*—Joseph A. Rhoa
*Attorney, Agent, or Firm*—David R. Treacy

[57] ABSTRACT

In an apparatus (1) for scanning an information-carrier disc (2) a scanning device (10) which is movable in a radial direction of the disc (2) is connected to a gear rack (16) which extends in the radial direction (11). The gear rack (16) can be driven via a gear mechanism (16) comprising a worm wheel (21), which is rotatable about a shaft (23) which is inclined relative to the plane of the disc (2), and a supporting member (27) which is coaxially connected to the worm wheel and which has a conical surface (26) provided with a spiral ridge (28) whose cross-sectional shape corresponds to the flank geometry of the gear rack (16) to drive the gear rack (16) (FIG. 1).

8 Claims, 2 Drawing Sheets

MECHANISM FOR PRECISE LINEAR MOVEMENT, AND APPARATUS USING SUCH A MECHANISM FOR SCANNING A DISC

BACKGROUND OF THE INVENTION

1. Field of the Invention

The invention relates to an apparatus for scanning an information-carrier disc.

2. Background of the Invention

Apparatus of the type to which this invention relates is known, namely a compact disc player, comprising a scanning device which is movably guided parallel to the plane of the disc. The apparatus includes a positioning mechanism for precisely moving the scanning device in a radial direction of the disc. Such a mechanism includes a gear rack which extends parallel to the plane of the disc in the radial direction and can be driven by a motor via a worm whose shaft extends parallel to the plane of the disc, a worm wheel which is in mesh with the worm, and a further drive member which is coaxially connected to the worm wheel and which meshes with the gear rack. Such an apparatus is known and is commercially available.

The prior-art apparatus comprises an optical scanning device for scanning an optically readable information carrier on which the information is stored in a spiral track and which is generally referred to as a Compact Disc. In such an apparatus the scanning device is movable radially or substantially radially of the information carrier to enable the scanning device to be moved selectively to any desired track portion of the spiral track. For this purpose it is desirable to position the scanning device with the greatest possible precision, which means that the travel of the scanning device per revolution of the motor should be minimal. This is achieved when the reduction ratio of the gear mechanism for driving the scanning device is as large as possible. Moreover, the gear mechanism should be as compact as possible in order to minimise the dimensions of the apparatus. In the prior-art apparatus the further drive member of the gear mechanism is a spur wheel, enabling only a comparatively small reduction ratio to be attained, which is in conflict with the requirement to position the scanning device with the greatest possible precision. To achieve a large overall reduction ratio of the gear mechanism the diameter of the worm wheel should therefore be comparatively large in order to accommodate a sufficiently large number of teeth for a large reduction ratio, but this is unfavourable for a compact construction of the gear mechanism.

SUMMARY OF THE INVENTION

It is an object of the invention to preclude the above problems and to provide an apparatus of the type defined above whose positioning mechanism combines a maximal overall reduction ratio with a most compact construction. To this end the invention is characterized in that, in a plane extending substantially perpendicularly to the plane of the disc and in the radial direction, the shaft of the worm wheel is inclined relative to the plane of the disc, and in that the further drive member, which is coaxially connected to the worm wheel, is constituted by a supporting member which is coaxial with the worm wheel and which has a conical surface and at least one spiral ridge whose cross-sectional shape corresponds to the flank geometry of the gear rack, to drive the gear rack.

The spiral ridge on the supporting member has an outer diameter which is less than the distance the scanning device is to be moved. Further, the rack has a large number of teeth. These features enable a very large reduction ratio to be obtained; that is, a multiplicity of revolutions of the supporting member are required to move the rack over the full distance. This is advantageous for a high-precision movement of the scanning device. The very large reduction ratio obtained by means of the spiral ridge enables the diameter of the worm wheel to be comparatively small, which leads to a very small reduction ratio of this wheel but in conjunction with the very large reduction ratio provided by the spiral ridge it yields a comparatively large overall reduction ratio of the gear mechanism, which guarantees a high-precision movement of the scanning device. The comparatively small dimensions of the worm wheel have the advantage that the gear mechanism occupies only a minimal space, which has the advantage that the construction of the apparatus can be as compact as possible.

It is to be noted that, for example from the IBM Technical Disclosure Bulletin, Vol. 22, No. 9, Feb. 1980, page 4152, an apparatus is known per se which, for positioning a magnetic scanning device for a magnetically readable disc-shaped information carrier in a radial direction of the disc-shaped carrier, comprises a motor-driven wheel formed with a spiral groove engaged by a groove-follower connected to the scanning device. In order to obtain a given overall travel for the scanning device of this apparatus the spiral groove should have a length in conformity with this overall travel, which means that the wheel should have a large diameter. However, in contradistinction to the apparatus in accordance with the invention, this apparatus does not comprise a gear mechanism for moving the scanning device, and because of the large dimension required for the wheel the apparatus cannot be comparatively compact like the apparatus in accordance with the invention.

In a mechanism in accordance with the invention the gear rack which can be driven by means of the spiral ridge may be offset relative to the axis of the worm wheel viewed perpendicularly to the plane of the information carrier, in which case the gear rack should have helical teeth. However, it is found to be advantageous if, viewed perpendicularly to the plane of the information carrier, the gear rack is substantially centred relative to the axis of the gear wheel. In this way it is achieved that the gear rack can be provided simply with straight teeth.

BRIEF DESCRIPTION OF THE DRAWINGS

Two embodiments of the invention will now be described in more detail, by way of non-limitative example, with reference to the drawings.

DETAILED DESCRIPTION OF THE PREFERRED EMBODIMENTS

Figure 1:
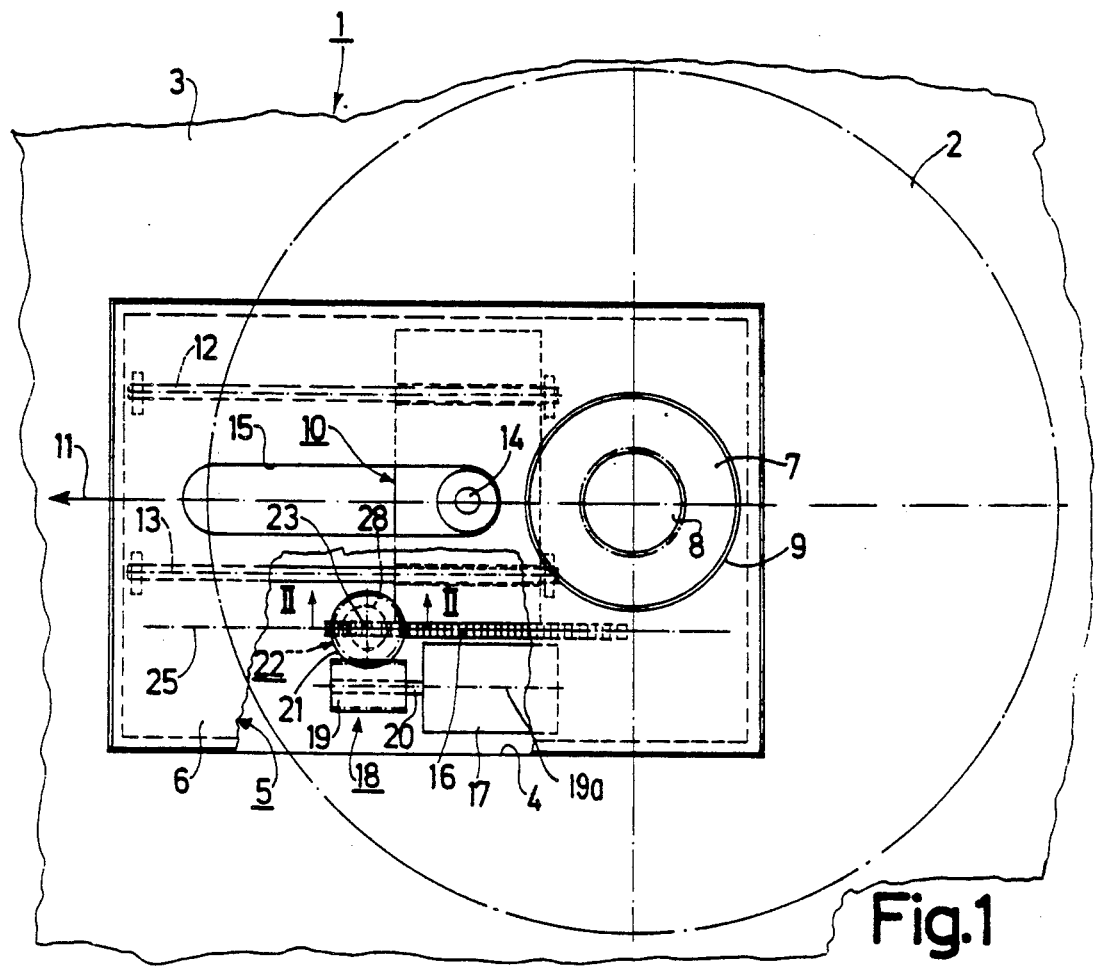
FIG. 1 is a plan view of a first embodiment of the invention in an apparatus for optically scanning an optically readable information-carrier disc.

For simplicity FIG. 1 shows only the relevant parts of an apparatus 1 in accordance with the invention for scanning a round information-carrier disc 2, which is shown diagrammatically in dash-dot lines in FIG. 1 and which is an optically readable information-carrier disc, generally referred to as a Compact Disc. The apparatus 1 comprises a plate-shaped housing wall 3 formed with a rectangular opening 4. In the opening 4 a trough-shaped chassis 5 is mounted, the upper wall 6 of the chassis 5 being substantially flush with the housing wall 3. A turntable 7, which can be rotated by a motor, not shown, is rotatably supported on the chassis 5, which turntable comprises a centering cone 8 for the disc 2 and extends through a circular opening 9 in the upper wall 6 of the chassis 5. The disc 2 can be rotated after it has been placed on the turntable 7, as is shown in FIG. 1. The disc 2 has a spiral track in which the information, for example music, is stored and from which this information can be read as the disc 2 is rotated.

For scanning the information-carrier disc 2, in order to read the information stored in the spiral track on the disc, the apparatus 1 comprises an optical scanning device 10. The scanning device 10 is movable parallel to the plane of the disc 2 in a radial direction of the disc 2, as is indicated by an arrow 11. The scanning device 10 is slid onto two guide rods 12 and 13 secured to the chassis 5 to guide the movements of the scanning device 10. The scanning device 10 comprises a lens 14 by means of which a light beam produced by a beam-generation system 10 can be focussed on the track on the disc 2 through a slot 15 which extends in the radial direction 11 in the upper wall 6 of the chassis 5, which beam is reflected from the track and is then modulated in conformity with the information stored in this track. By means of the lens 14 the reflected light beam is directed to a photoelectric detector system in the scanning device 10 to derive electric information signals corresponding to the recorded information being scanned from the modulated light beam, which signals are further processed in order to reproduce the recorded information in perceptible form.

For moving the scanning device 10 in the radial direction 11, in order to position the scanning device 10 and hence its lens 14 at any desired track portion of the spiral track on the disc 2, the scanning device 10 is connected to a gear rack 16 which extends in the radial direction 11 parallel to the plane of the disc 2, the teeth projecting from this gear rack towards the disc 2. The gear rack 16 can be driven in opposite directions by a reversible motor 17 via a gear mechanism 18. The gear mechanism 18 comprises a worm 19 which can be driven by the motor 17 and which is mounted on the motor shaft 20 so as to be rotated thereby. The motor 17 and the worm 19 are arranged in such a way that the shaft 20 and axis 19a (see FIG. 2) of the worm 19 extend parallel to the plane of the disc 2. The gear mechanism 18 further comprises a worm wheel 21 in mesh with the worm 19 and a further drive member 22 which is coaxially connected to the worm wheel 21 and in mesh with the gear rack 16. The worm wheel 21 and the further drive member 22, which is coaxial with the worm wheel, are rotatable about a shaft 23.

Figure 2:
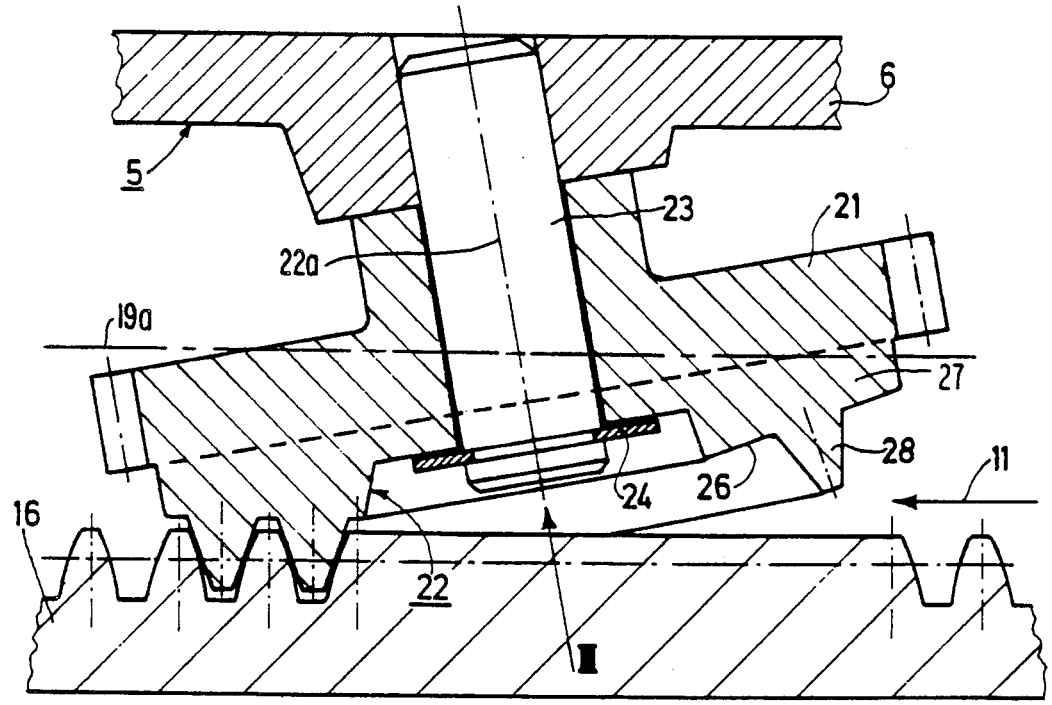
FIG. 2 shows the drive member comprising the spiral ridge and the gear rack to be driven thereby in a sectional view taken on the line II—II in FIG. 1, to a scale ten times as large as that of FIG. 1.
Figure 3:
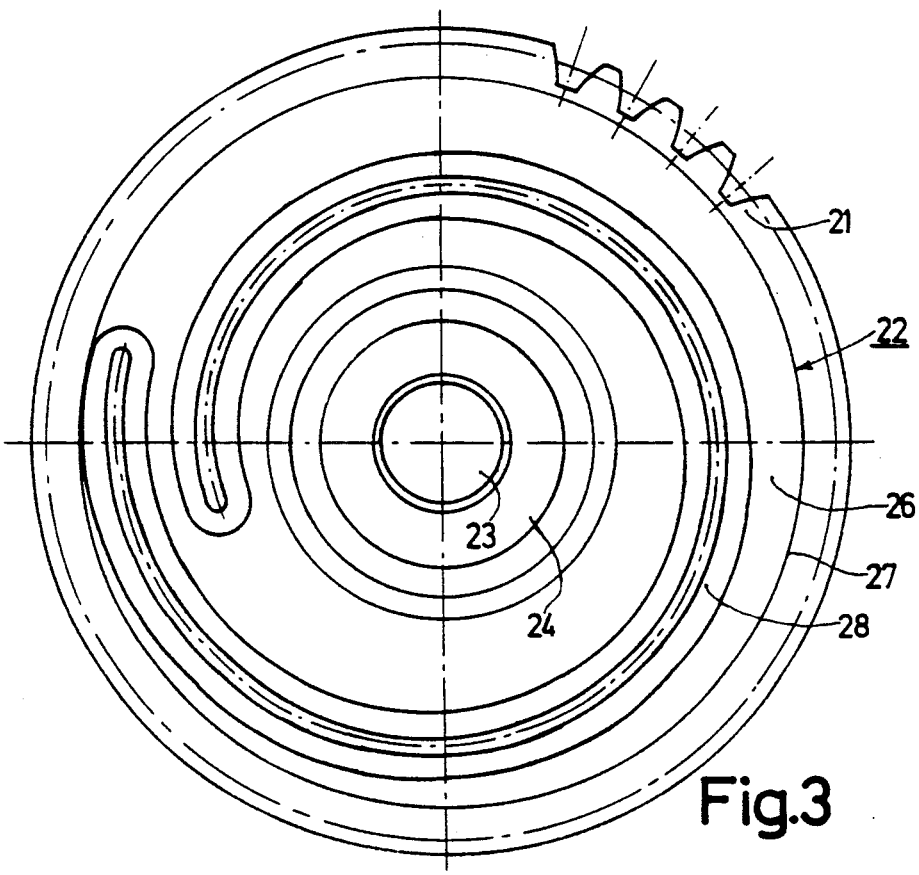
FIG. 3 shows the drive member with the spiral ridge in a view as indicated by the arrow III in FIG. 2, and FIG. 4, similarly to FIG. 3, shows a second embodiment of the invention, in which the drive member comprises two spiral ridges for driving a gear rack.

The shaft 23 of the worm wheel 21 in the apparatus shown in FIG. 1 is locked against rotation in the upper wall 6 of the chassis, and the worm wheel 21 is retained on this shaft by means of a retaining ring 24. As is illustrated in FIG. 2, the axis 22a of the worm wheel 21 and drive member 22 lies in a plane extending perpendicular to the plane of the disc 2, and extending in the radial direction 11, i.e. a plane parallel to the plane of the drawing in FIG. 2 and indicated by a dash-dot line 25 in FIG. 1. The shaft is inclined relative to the plane of the disc 2, which extends parallel to the upper wall 6, and thus is likewise inclines with respect to a plane perpendicular to the direction 11. FIG. 2 further shows that, in order to drive the gear rack 16, the further drive member 22, which is coaxially connected to the worm wheel 21, comprises a supporting member 27, coaxial with the worm wheel 21 and having a conical surface 26, and a spiral ridge 28, formed on said conical surface 26 and having a cross-sectional shape corresponding to the flank geometry of the gear rack 16. As can be seen in FIG. 1, viewed perpendicularly to the plane of the information-carrier disc 2, the gear rack 16 is centred relative to the shaft 23 of the worm wheel 21; that is, the plane 25, in which the axis 22a of the drive member 22 lies, in perpendicular to and bisects the teeth of the rack. This arrangement enables the gear rack to be formed simply with straight teeth.

In the present apparatus the supporting member 27 is simply constructed as a projection of the worm wheel 21, the worm wheel and the projection being formed as an integral part. The supporting member 27, however, may also be constructed as a separate part which is coaxially connected to the worm wheel by separate means. As can be seen in FIG. 2, the inclination of the shaft 23 is selected in such a way that the conical surface 26 extends parallel to the gear rack 16 at the location where a portion of the ridge 28 meshes with the gear rack 16. Thus the diametrically opposed portion of the ridge is free from contact with the rack 16.

In the present apparatus the ridge 28 is formed as an Archimedean spiral, so that it imparts a uniform motion to the gear rack. However, the ridge may also take the form of a different spiral, for example a Galilean spiral. As stated above, the cross-sectional shape of the ridge corresponds to the flank geometry of the gear rack 16 and in the present apparatus the cross-sectional shape of the ridge exhibits the basic profile of the gear rack 16. Since this basic profile is trapezoidal, the lateral flanks of the ridge are therefore straight. However, alternatively the lateral flanks of a ridge may exhibit an involute shape, the cross-sectional shape of this ridge corresponding to that of the gear-rack teeth.

The spiral ridge provides a very large reduction ratio because the gear rack is moved by only one tooth pitch during every revolution of the worm wheel and hence of the ridge. This is an advantage for a high-precision movement of the gear rack and, consequently, the scanning device. As a result of the very large reduction ratio obtained by means of the spiral ridge the worm wheel can be of comparatively small diameter, which leads to a comparatively small reduction ratio of the worm wheel but owing to the very large reduction ratio provided by the spiral ridge yields a comparatively large overall reduction ratio of the gear mechanism, thus guaranteeing a high-precision movement of the scanning device. The use of a worm wheel of comparatively small diameter has the advantage that a gear mechanism is obtained which requires only a small amount of space, which is advantageous for a compact construction.

Figure 4:
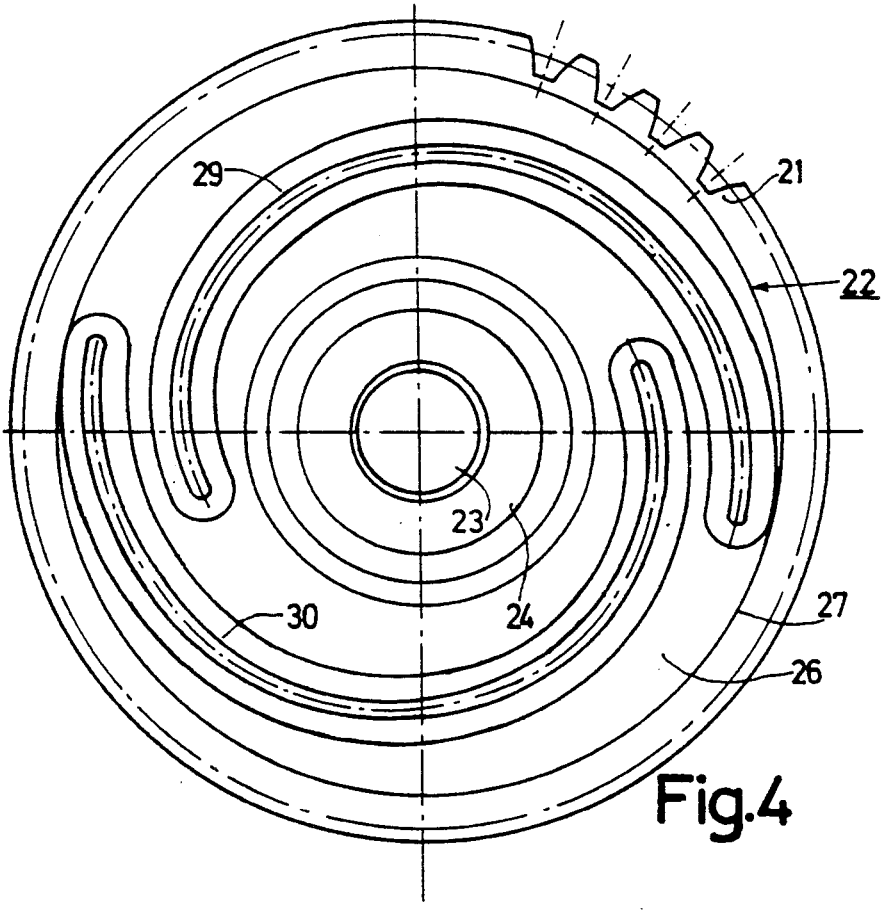

In the embodiment described above the further drive member 22 comprises a single ridge 28 which takes the form of an Archimedean spiral. In the embodiment shown in FIG. 4 the conical surface 26 of the further drive member 22 is provided with two ridges 29 and 30 in the form of Archimedean spirals, which consecutively mesh with the gear rack to be driven. With this further drive member the gear rack is moved by two tooth pitches during one revolution of said drive member. However, the further drive member may also be provided with more than two spiral ridges which mesh with the gear rack, the number of ridges dictating the number of tooth pitches by which the gear rack is moved during every revolution of the further drive member. It will be appreciated that in this way, i.e. by the choice of the number of spiral ridges of the further drive member, the travel of the gear rack per revolution of the further drive member can be adapted simply to the requirements imposed on the high-precision movement of a scanning device.

I claim:

1. An apparatus for scanning an information carrier disc, comprising:
    means for rotating said disc in a plane, about a disc axis,
    a rack extending in a given direction parallel to said plane, having a multiplicity of teeth extending over a length of the rack at least equal to a radial distance of scanning,
    means for mounting said scanning device and said rack for movement together in said given direction,
    a drive member having a supporting portion and a spiral ridge extending in a generally axial direction about a drive member axis, said spiral ridge having an outer diameter less than said radial distance,
    means for mounting said drive member for rotation about said drive member axis, with said drive member axis being inclined with respect to a plane perpendicular to said given direction, a first portion of said spiral ridge engaging between two of said teeth and a second portion of said ridge diametrically opposite said first portion being free of contact with the rack, and
    means for driving said drive member for rotation about said drive member axis,
    whereby scanning over the said radial distance requires a multiplicity of revolutions of said drive member.

2. An apparatus as claimed in claim 1, characterized in that said axis is substantially centered with respect to a centerline of said rack.

3. An apparatus as claimed in claim 1, characterized in that said supporting portion has a conical surface from which said ridge extends.

4. An apparatus as claimed in claim 1, characterized in that said spiral ridge has a cross-sectional shape for cooperative engagement with said teeth.

5. An apparatus as claimed in claim 1, characterized in that said means for driving comprises a worm wheel fixed coaxially to said drive member; a worm mounted for rotation about a worm axis parallel to said given direction, and in engagement with said worm wheel; and means for rotating said worm.

6. An apparatus as claimed in claim 1, characterized in that said spiral is an Archimedean spiral.

7. An apparatus as claimed in claim 1, characterized in that said drive member comprises two said spiral ridges arranged for consecutive engagement with said rack.

8. An apparatus as claimed in claim 1, characterized in that said supporting portion has a conical surface from which said ridge extends,
    said spiral ridge has a cross-sectional shape for cooperative engagement with said teeth, and
    said means for driving comprises a worm wheel fixed coaxially to said drive member; a worm mounted for rotation about a worm axis parallel to said given direction, and in engagement with said worm wheel; and means for rotating said worm.

* * * * *